US012534221B2

(12) United States Patent
Bunting et al.

(10) Patent No.: US 12,534,221 B2
(45) Date of Patent: Jan. 27, 2026

(54) METHODS AND SYSTEMS FOR DETECTING DEGRADATION OF ACTUATOR-POSITION SENSOR

(71) Applicant: The Boeing Company, Arlington, VA (US)

(72) Inventors: Michael Bunting, Charleston, SC (US); Dean Nguyen, Seal Beach, CA (US)

(73) Assignee: The Boeing Company, Arlington, VA (US)

( * ) Notice: Subject to any disclaimer, the term of this patent is extended or adjusted under 35 U.S.C. 154(b) by 212 days.

(21) Appl. No.: 18/493,595

(22) Filed: Oct. 24, 2023

(65) Prior Publication Data

US 2025/0128827 A1 Apr. 24, 2025

(51) Int. Cl.
*B64D 45/00* (2006.01)
*B64F 5/60* (2017.01)
(52) U.S. Cl.
CPC ............... *B64D 45/00* (2013.01); *B64F 5/60* (2017.01); *B64D 2045/0085* (2013.01)

(58) Field of Classification Search
CPC ..................................................... B64D 45/00
See application file for complete search history.

(56) References Cited

U.S. PATENT DOCUMENTS 12,306,140 B2 * 5/2025 Harle ................. G01M 5/0066
2024/0128827 A1 * 4/2024 Arnault ................. F16C 41/002

* cited by examiner

*Primary Examiner* — Michael A Berns
(74) *Attorney, Agent, or Firm* — Kunzler Bean & Adamson

(57) ABSTRACT

Disclosed herein is a system for determining a condition of an actuator-position sensor. The system comprises a first circuit electrically coupled with the actuator-position sensor to convert a voltage pattern generated by the actuator-position sensor to an output voltage. The system also comprises a comparator circuit electrically coupled with the first circuit and configured to determine if the output voltage of the first circuit exceeds a first threshold. The system further comprises an output device electrically coupled to the comparator circuit and configured to indicate a first output, associated with a first condition of the actuator-position sensor, when the output voltage of the first circuit exceeds the first threshold.

20 Claims, 6 Drawing Sheets

METHODS AND SYSTEMS FOR DETECTING DEGRADATION OF ACTUATOR-POSITION SENSOR

FIELD

This disclosure relates generally to detecting degradation of an actuator-position sensor, and more particularly to systems and methods for detecting degradation of an actuator-position sensor used in wing flap of an aircraft.

BACKGROUND

Aircraft wings have wing flaps that are extended, such as during landing operations. Each wing may have one or more flaps, and each flap usually has an actuator-position sensor. The actuator-position sensor determines the extension of the corresponding flap. A skew sensing system receives inputs from at least two actuator-position sensors, one on the left wing of the aircraft and one on the right wing of the aircraft. If the skew sensing system determines that a flap on one side is extended more or extended less than the corresponding flap on the other side, it raises an alarm to indicate skew. This alarm may cause a lock out condition to occur whereby the extension of the flaps is halted.

At present, systems and methods for testing degradation of the actuator-position sensor are based on static testing methods. These include testing various electrical characteristics of the actuator-position sensor, such as voltage, resistance, etc., to determine failure. These tests are usually carried out by removal of the actuator-position sensor from the wing flap. Alternatively, in situ testing, or testing while the actuator-position sensor is in place in the wing, requires a flight technician to physically access the actuator-position sensor in the wing flap. These tests are therefore time consuming. Additionally, the actuator-position sensor may not indicate degraded electrical characteristics during static testing, but which are otherwise present during flight. Such shortcomings make these conventional techniques inadequate to accurately detect degradation of an actuator-position sensor.

SUMMARY

The subject matter of the present application has been developed in response to the present state of the art, and in particular, in response to the shortcomings of conventional systems and methods for detecting degradation of an actuator-position sensor, that have not yet been fully solved by currently available techniques. Accordingly, the subject matter of the present application has been developed to provide systems and methods for detecting degradation of an actuator-position sensor that overcome at least some of the above-discussed shortcomings of prior art techniques.

The following is a non-exhaustive list of examples, which may or may not be claimed, of the subject matter, disclosed herein.

Disclosed herein is a system for determining a condition of an actuator-position sensor. The system comprises a first circuit electrically coupled with the actuator-position sensor to convert a voltage pattern generated by the actuator-position sensor to an output voltage. The system also comprises a comparator circuit electrically coupled with the first circuit and configured to determine if the output voltage of the first circuit exceeds a first threshold. The system further comprises an output device electrically coupled to the comparator circuit and configured to indicate a first output, associated with a first condition of the actuator-position sensor, when the output voltage of the first circuit exceeds the first threshold. The preceding subject matter of this paragraph characterizes example 1 of the present disclosure.

The comparator circuit is further configured to determine if the output voltage of the first circuit exceeds a second threshold that is different than the first threshold. The output device indicates a second output, associated with a second condition of the actuator-position sensor, when the output voltage of the first circuit exceeds the second threshold, but not the first threshold. The preceding subject matter of this paragraph characterizes example 2 of the present disclosure, wherein example 2 also includes the subject matter according to example 1, above.

The comparator circuit is further configured to determine if the output voltage of the first circuit does not exceed the second threshold. The output device indicates a third output, associated with a third condition of the actuator-position sensor, when the output voltage of the first circuit does not exceed the second threshold. The preceding subject matter of this paragraph characterizes example 3 of the present disclosure, wherein example 3 also includes the subject matter according to example 2, above.

The voltage pattern generated by the actuator-position sensor comprises a first AC voltage output, a second AC voltage output, and a third AC voltage output. The first circuit comprises a voltage rectifier circuit configured to convert the first AC voltage output, the second AC voltage output, and the third AC voltage output to a DC voltage output. The preceding subject matter of this paragraph characterizes example 4 of the present disclosure, wherein example 4 also includes the subject matter according to any of examples 1-3, above.

When an input voltage is applied to the actuator-position sensor and an actuator associated with the actuator-position sensor is actuated, the voltage pattern is generated at by the actuator-position sensor. The preceding subject matter of this paragraph characterizes example 5 of the present disclosure, wherein example 5 also includes the subject matter according to any of examples 1-4, above.

The actuator comprises a wing-flap actuator. The preceding subject matter of this paragraph characterizes example 6 of the present disclosure, wherein example 6 also includes the subject matter according to any of examples 1-4, above.

The actuator-position sensor comprises a three-phase synchro sensor. The preceding subject matter of this paragraph characterizes example 7 of the present disclosure, wherein example 7 also includes the subject matter according to any of examples 1-6, above.

The system further comprises an aircraft comprising a wing flap, the first circuit, the actuator, and the actuator-position sensor. The actuator is a wing-flap actuator operable to extend and retract the wing flap. The actuator-position sensor is electrically coupled to a skew detection system configured to determine a skewness of the wing flap. The preceding subject matter of this paragraph characterizes example 8 of the present disclosure, wherein example 8 also includes the subject matter according to any of examples 1-7, above.

Also disclosed herein is a method of determining a condition of an actuator-position sensor. The method comprises sensing an output voltage signal from the actuator-position sensor. The method also comprises converting the output voltage signal to a direct current voltage. The method further comprises comparing the direct current voltage to a first voltage threshold. The method additionally comprises when the direct current voltage exceeds the first voltage threshold, visually displaying an indicator of a healthy sensor condition. The method also comprises when the direct current voltage does not exceed the first voltage threshold, but exceeds a second voltage threshold, visually displaying an indicator of a degraded sensor condition. The method further comprises in response to determining that the direct current voltage does not exceed the second voltage threshold, visually displaying an indicator of a failed sensor condition. The preceding subject matter of this paragraph characterizes example 9 of the present disclosure.

The output voltage signal from the actuator-position sensor comprises a first AC voltage, a second AC voltage, and a third AC voltage. Converting the output voltage signal to the direct current voltage comprises converting the first AC voltage, the second AC voltage, and the third AC voltage using a rectifier circuit. The preceding subject matter of this paragraph characterizes example 10 of the present disclosure, wherein example 10 also includes the subject matter according to example 9, above.

The method further comprises actuating an actuator associated with the actuator-position sensor, wherein the output voltage signal is sensed when the actuator-position sensor is actuated. The preceding subject matter of this paragraph characterizes example 11 of the present disclosure, wherein example 11 also includes the subject matter according to any of examples 9-10, above.

The method further comprises applying a fourth AC voltage to a rotor circuit of the actuator-position sensor at least in part during a time period when the actuator associated with the actuator-position sensor is actuated. The preceding subject matter of this paragraph characterizes example 12 of the present disclosure, wherein example 12 also includes the subject matter according to example 11, above.

The actuator associated with the actuator-position sensor is a wing-flap actuator operable to extend and retract a wing flap of an aircraft. Actuating the actuator associated with the actuator-position sensor further comprises extending the wing flap of the aircraft. The preceding subject matter of this paragraph characterizes example 13 of the present disclosure, wherein example 13 also includes the subject matter according to any of examples 11-12, above.

The method further comprises extending a first wing flap associated with a first wing. The method also comprises determining a sensor condition associated with an actuator-position sensor associated with the first wing flap. The method additionally comprises extending a second wing flap associated with a second wing. The method further comprises determining a sensor condition associated with an actuator-position sensor associated with the second wing flap. The preceding subject matter of this paragraph characterizes example 12 of the present disclosure, wherein example 12 also includes the subject matter according to example 11, above.

Additionally disclosed herein is a device for determining a condition of an actuator-position sensor. The device comprises a housing. The device also comprises a first electrical connector configured to matingly engage with a second electrical connector associated with an output of the actuator-position sensor. The device further comprises a sensor-condition indicator coupled to the housing. The device additionally comprises a first circuit housed by the housing and electrically coupled to the first electrical connector. The first circuit converts a voltage pattern generated by the actuator-position sensor to an output voltage. The device also comprises a second circuit housed by the housing and electrically coupled to the first circuit and the sensor-condition indicator. The second circuit compares the output voltage to a threshold healthy voltage and a threshold failure voltage and transmits a signal to the sensor-condition indicator to display any one of a healthy visual output or a degraded visual output based on the comparison between the output voltage to the threshold healthy voltage and the threshold failure voltage. The preceding subject matter of this paragraph characterizes example 15 of the present disclosure.

The first electrical connector, when matingly engaged with the second electrical connector, does not disrupt electrical connectability between the second electrical connector and the actuator-position sensor. The preceding subject matter of this paragraph characterizes example 16 of the present disclosure, wherein example 16 also includes the subject matter according to example 15, above.

The sensor-condition indicator comprises a healthy condition indicator, a degraded condition indicator, and a failure condition indicator. The preceding subject matter of this paragraph characterizes example 17 of the present disclosure, wherein example 17 also includes the subject matter according to any of examples 15-16, above.

The second circuit transmits the signal to the sensor-condition indicator to display any one of the healthy visual output, the degraded visual output, or a failure visual output based on the comparison between the output voltage to the threshold healthy voltage and the threshold failure voltage. The preceding subject matter of this paragraph characterizes example 18 of the present disclosure, wherein example 18 also includes the subject matter according to example 17, above.

The first circuit converts the voltage pattern generated by the actuator-position sensor to an output voltage by rectifying three AC voltages, generated by the actuator-position sensor, to a direct current output voltage. The preceding subject matter of this paragraph characterizes example 19 of the present disclosure, wherein example 19 also includes the subject matter according to any of examples 15-18, above.

The device further comprises an excitation check circuit configured to generate an excitation signal and transmit the excitation signal to the actuator-position sensor. The preceding subject matter of this paragraph characterizes example 20 of the present disclosure, wherein example 20 also includes the subject matter according to any of examples 15-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Figure 1:
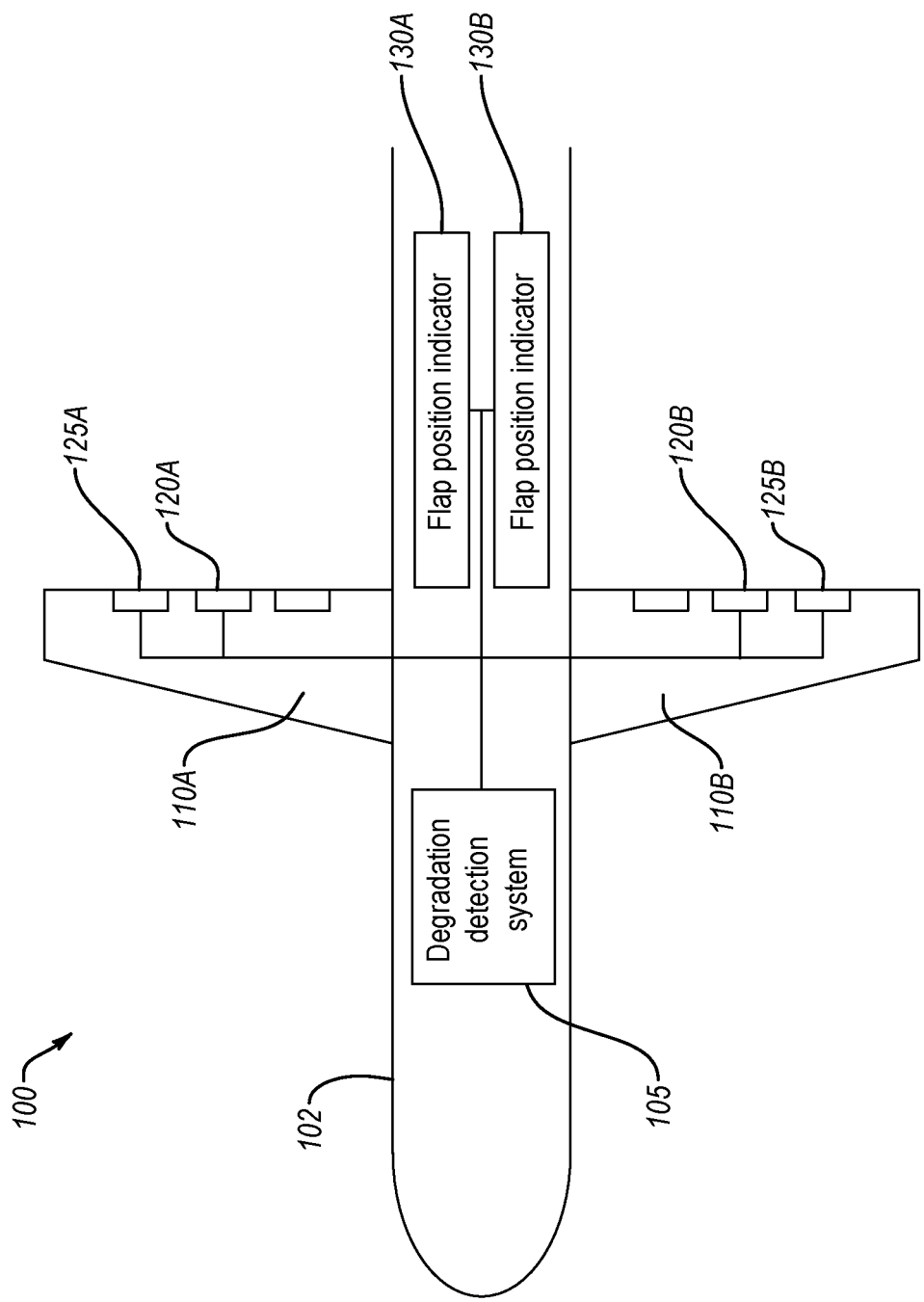
FIG. 1 is a schematic view of an aircraft, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Each wing of an aircraft has one or more flaps. Aircraft flap position monitoring devices include skew sensors, flap position transmitters, and flap position indicators. Each of these can be considered an actuator-position sensor. If the actuator-position sensor experiences a degradation in its operation during operation of the wing flap, it does not generate an output signal or the output signal does not correspond to the actual movement of the wing flap.

A skew sensing system receives inputs from at least two actuator-position sensors, one on the left wing of the aircraft and one on the right wing of the aircraft. If the skew sensing system determines that a flap on one side is extended more or extended less than the corresponding flap on the other side, it raises an alarm to indicate skew. This alarm can cause a lock out condition to occur whereby the extension of the flaps is halted.

When the actuator-position sensor is degraded or failing, the skew sensing system may erroneously determine that there is a skew condition and halt the operation of the wing flaps even though no skew condition existed.

There is a lack of a field test to identify degradation of actuator-position sensor or interconnecting wiring which can cause intermittent failure. To prevent repeat inflight failures, technicians are directed to replace multiple system components based on arbitrary and anecdotal information. This often leads to continued intermittent operation and further skews reliability data. A qualitive test, especially a dynamic and simplified test, is necessary to identify faults that normally only occur during flap operation. Manufacturer testing has also proved inadequate in detecting inflight only faults when units are returned for shop analysis. The combination of inadequate on wing and shop testing leads to potentially unnecessary mass replacement of flap components.

During operation, wiring, connections and components degrade normally over time due to wear associated with flap movement and exposure to severe changes in environmental conditions. The currently used tools and procedures are unable to detect component and wiring degradation associated with flap lockouts due to their inability to detect small changes using static testing with low resolution devices. To perform more accurate test with existing equipment, substantial aircraft disassembly to remove and/or access components, and highly-skilled personnel to detect subjective anomalies while operating the components are needed. These significantly increase the cost of operation and delay between landing and take-off.

Testing of failed actuator-position sensors has been used to determine that the insulation resistance or dielectric absorption rate may still indicate ideal performance. Therefore, these tests cannot be used to correctly predict failure. There are various causes for degradation or failure of the actuator-position sensor. These include intermittent connection issues in the rotor circuit, conductivity issues with the slip rings, insulation failure of various contacts in the construction of the actuator-position sensor, solder connection anomalies, etc.

The systems and methods disclosed herein enable the detection of degradation of an actuator-position sensor. The system is used to determine voltage output from the actuator-position sensor during operation. As the actuator-position sensor cycles through all of its positions, any potential failure is measurable based on the voltage output. The voltage output is compared to predetermined thresholds. The thresholds are determined based on various tests conducted on various actuator-position sensors in various stages of healthy, degraded and failed performance. These thresholds may be modified during operation of the systems and methods to account for any other factors.

FIG. 1 is a schematic view of an aircraft, according to one or more examples of the present disclosure. Aircraft 102 includes degradation detection system 105 that is used to determine degradation of one or actuator-position sensors or similar components of aircraft 102. Actuator-position sensors include skew sensor 120, flap position transmitter 125, and flap position indicator 130. Skew sensor 120 and flap position transmitter 125 are connected to one or more flap actuation mechanisms on wing 110. More specifically, right wing 110A includes skew sensor 120A, flap position transmitter 125A, and flap position indicator 130A. Left wing 110B includes skew sensor 120*b*, flap position transmitter 125B, and flap position indicator 130B. In one example, there are 4 skew sensors on each wing 110.

Actuator-position sensors output an electric signal that corresponds to the number of rotations of an actuator that is coupled to the actuator-position sensor. In one example, actuator-position sensor is a synchro. A synchro is a type of rotary electrical transformer sensor that is used for measuring the angle of a rotating member. The measurement of the angle of rotation can be converted to a linear measurement. In a synchro system, the primary winding of the transformer, fixed to the rotor, is excited by an alternating current. This causes voltages to appear between the Y-connected secondary windings fixed at 120 degrees to each other on the stator. The voltages are measured and used to determine the angle of the rotor relative to the stator.

In one example, skew sensor 120 is operated when a wing flap is operated. As the wing flap is operated, it causes rotation of an actuator coupled with skew sensor 120 causing skew sensor 120 to generate an output signal.

In one example, flap position transmitter 125 is operated when a wing flap is operated. As the wing flap is operated, it causes rotation of an actuator coupled with flap position transmitter 125 causing flap position transmitter 125 to generate an output signal. In one example, the output signal from flap position transmitter 125 is transmitted to flap position indicator 130. In another example, the output signal from the flap position transmitted 125 is feedthrough to flap position indicator 130 via a flap/slat electronic unit.

In one or more examples, flap position indicator 130 is a synchro motor operating on the same principle as skew sensor 120 and/or flap position transmitter 125, but instead of sensing movement, it accepts in input signal and converts that into rotations of a rotor.

Figure 2:
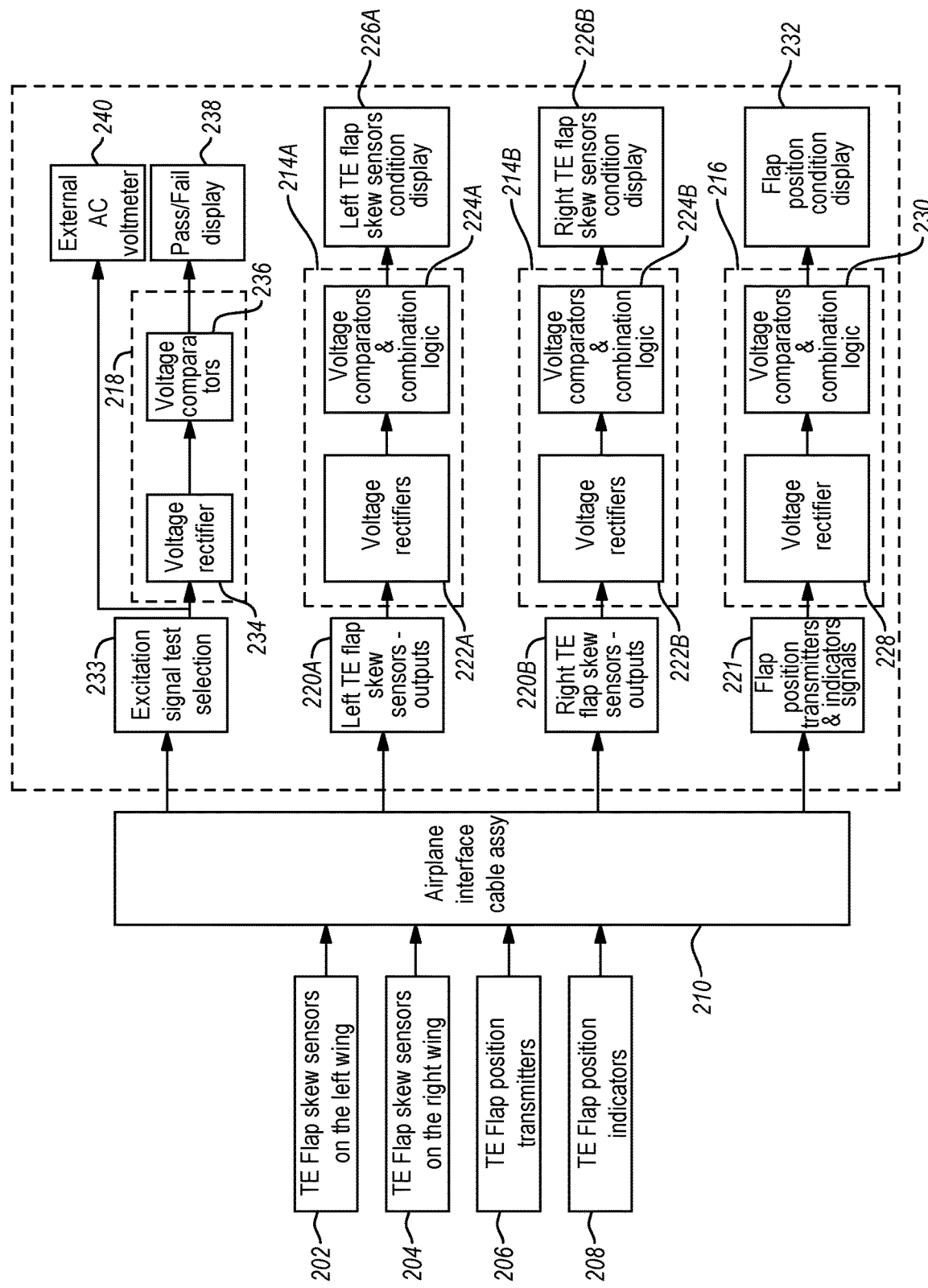
FIG. 2 is a schematic block diagram of a system for detecting degradation of an actuator-position sensor, according to one or more examples of the present disclosure.

FIG. 2 is a schematic block diagram of a system for detecting degradation of an actuator-position sensor, according to one or more examples of the present disclosure. System 200 includes one or more left wing skew sensors 202, one or more right wing skew sensors 204, one or more flap position transmitters 206, and one or more flap position indicators 208. Airplane interface cable assembly 210 interfaces with existing connections in aircraft 102 such that output from these sensors are transmitted to degradation detection system 212. In one example, airplane interface cable assembly 210 has a number of pins that connect with one or more ports that exist on an aircraft data interface system. In one example, there are four skew sensors on each wing, one flap position transmitter for each wing and one flap position indicator for each wing, for a total of twelve actuator-position sensors. Each of these actuator-position sensors may have three or more outputs and corresponding pins, plus common outputs such as ground, etc. These outputs are connected to one or more ports that exists on an aircraft data interface system. These outputs are also connected to one or more existing aircraft detection and display systems, such as a skew detection system, flap position indicator system, flap position control system, etc. The skew detection system tracks the output of skew sensors on each wing and determines if one flap is overextended as compared to the corresponding flap on the other wing.

Degradation detection system 212 includes left flap degradation detection system 214a, right flap degradation detection system 214b, flap position condition indication system 216 and voltage excitation check system 218. Although FIG. 2 shows a single left flap degradation detection system 214a, a single right flap degradation detection system 214b, and a single flap position condition indication system 216, in one example, for each left wing skew sensor 202, right wing skew sensor 204, flap position transmitter 206, and flap position indicator 208, a corresponding left flap degradation detection system 214a, right flap degradation detection system 214b, and flap position condition indication system 216 respectively is present in degradation detection system 212. In one example, each actuator-position sensor has a corresponding degradation determination system to determine degradation. In another example, there is only one system to determine degradation and the output from each actuator-position sensor is cycled through the degradation determination system.

Flap degradation detection system 214 is connected to the output from the corresponding skew sensor from the flap via airplane interface cable assembly 210. The output 220 from the skew sensor is connected to voltage rectifier 222. Output from voltage rectifier 222 is connected to voltage comparator 224. Output from voltage comparator 224 is connected to condition display system 226. Similarly, flap position condition indication system 216 is connected to the output from the corresponding flap position transmitter 206 and flap position indicator 208 via airplane interface cable assembly 210. Flap position transmitters and indicators signals 221 are connected to voltage rectifier 228. Output from voltage rectifier 228 is connected to voltage comparator 230. Output from voltage comparator 230 is connected to condition display system 232.

Degradation detection system 212 also includes voltage excitation check system 218 that determines whether the skew sensors 202, skew sensors 204, flap position transmitters 206 and flap position indicators 208 receive the required excitation voltage for their proper operation. In one example, a single voltage excitation check system 218 is used for skew sensors 202, skew sensors 204, flap position transmitters 206 and flap position indicators 208. To test the excitation voltage for the skew sensors 202, skew sensors 204, flap position transmitters 206 and flap position indicators 208, selection switch 233 is included to select the actuator-position sensor being tested. A technician operates selection switch 233 to select the actuator-position sensor that needs to be tested. In one example, after an actuator-position sensor has been identified by a technician as degraded, the technician then conducts a voltage excitation check for the degraded actuator-position sensor to confirm that the actuator-position sensor is degraded.

Output from the selected actuator-position sensor is connected to voltage rectifier 234. Output from rectifier 234 is connected to voltage comparator 236. Output from voltage comparator 236 is connected to condition display 238. In one example, degradation detection system 212 also includes connectors 240 for a technician to plug in a multimeter to determine the actual excitation voltage from the selected actuator-position sensor.

In one or more examples, airplane interface cable assembly 210 is electrically coupled to the outputs from skew sensors 202, skew sensors 204, flap position transmitters 206 and flap position indicators 208 and converts these outputs into data signals that are transmitted to degradation detection system 212 over a data network. In one example, the data network is a wireless network. In one example, the data network is a cellular network. In one example, the data network is a satellite communications network.

In one or more examples, one or more of condition display system 226, condition display system 232 and condition display system 238 are indicators such as LEDs, gauges, etc. that are coupled to the output from voltage comparator 224, voltage comparator 230 and voltage comparator 236 respectively. In one example, the output from one or more of voltage comparator 224, voltage comparator 230 and voltage comparator 236 is converted to a data signal that is transmitted over a data network. In one example, the data network is a wireless network. In one example, the data network is a cellular network. In one example, the data network is a satellite communications network. In one or more examples, one or more of condition display system 226, condition display system 232 and condition display system 238 are displays on an instrument panel of aircraft 102.

Figure 3:
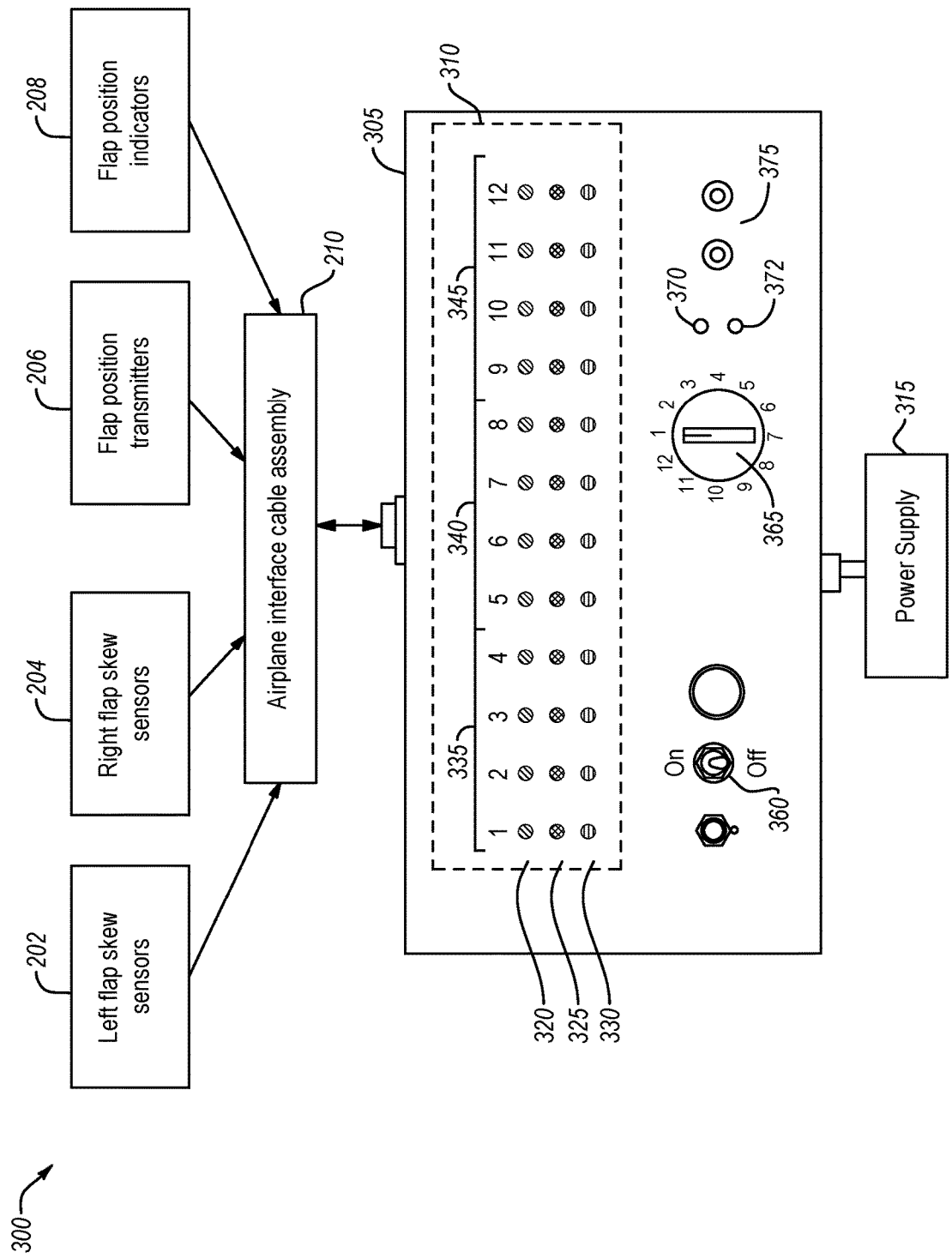
FIG. 3 is a diagram of an apparatus for detecting degradation of an actuator-position sensor, according to one or more examples of the present disclosure.

Referring to FIG. 3, in various examples, an apparatus 300 for detecting degradation of an actuator-position sensor, according to one or more examples of the present disclosure. Apparatus 300 includes housing 305 which supports condition display system 310. In the example of FIG. 3, condition display system 310 includes three different colored LEDs for each of the skew sensors 202, skew sensors 204, flap position transmitters 206 and flap position indicators 208. LED 320 corresponds to a healthy condition of the corresponding actuator-position sensor. LED 325 corresponds to a degraded condition of the corresponding actuator-position sensor. LED 330 corresponds to a failure condition of the corresponding actuator-position sensor.

LED 320, LED 325, and LED 330 are visually separated to clearly identify the corresponding actuator-position sensor, such as left skew sensor display 335, right skew sensor display 340, and flap position condition display 345. Within each of those, is each individual actuator-position sensor, 350a-350l. For example, for left wing flap skew sensor 1 (350a), LED 320a corresponds to a healthy condition, LED 325a corresponds to a degraded condition, and LED 330a corresponds to a failure condition. In other examples, visual or auditory identification methods, other than LEDs, can be used to identify the statuses of the sensors.

Also included in housing 305 is power switch 360 and excitation signal test selection switch 365. In the example of FIG. 3, excitation signal test selection switch 365 has twelve positions, each corresponding to an actuator-position sensor (4 left skew sensors, 4 right skew sensors, a left flap position transmitter, a right flap position transmitter, a left flap position indicator, and a right flap position indicator). A technician may select an actuator-position sensor via excitation signal test selection switch 365. LED 370 and LED 372 correspond to a pass and fail condition of the selected actuator-position sensor. Housing 305 also includes connection plugs for the technician to plug in a multimeter to view the actual excitation voltage of the selected actuator-position sensor. Power supply 315 is connected to housing 305. In one example, housing 305 includes a power cable to connect to a wall power supply, such as a standard 110V AC outlet. In another example housing 305 includes a voltage transformer to convert 110V AC to 28V AC that is used as the excitation voltage for the actuator-position sensor.

In another example, excitation signal test selection switch 365 has six positions, one corresponding to the four left skew sensors, a second one corresponding to the four right skew sensors, a third corresponding to the left flap position transmitter, a fourth corresponding to the right flap position transmitter, a fifth corresponding to the left flap position indicator, and a sixth corresponding to the right flap position indicator. When excitation signal test selection switch 365 is in a position that corresponds to the left skew sensors, an excitation voltage is connected to all four left skew sensors at the same time and the four left skew sensors are tested simultaneously. When excitation signal test selection switch 365 is in a position that corresponds to the right skew sensors, an excitation voltage is connected to all four right skew sensors at the same time and the right skew sensors are tested simultaneously.

In one or more examples, during operation of device 300, a technician operates flaps of the aircraft wings. This operations causes continuous signals from skew sensor 120, flap position transmitter 125, and flap position indicator 130 to be received by device 300. Output display 310 continuously displays an output for each of the twelve 350a-350l actuator-position sensors. The technician continuously monitors the condition of the actuator-position sensors based on the healthy condition indicator 320, degraded condition indicator 325, and failure condition indicator 330 for each of the 350a-350l actuator-position sensors. If one or more of the condition indicators indicate a degraded or failure condition, the technician may then operate excitation signal test selection switch 365 to select the corresponding actuator-position sensor that indicates a degraded or failure condition to determine if that actuator-position sensor is receiving the proper excitation voltage.

Figure 4:
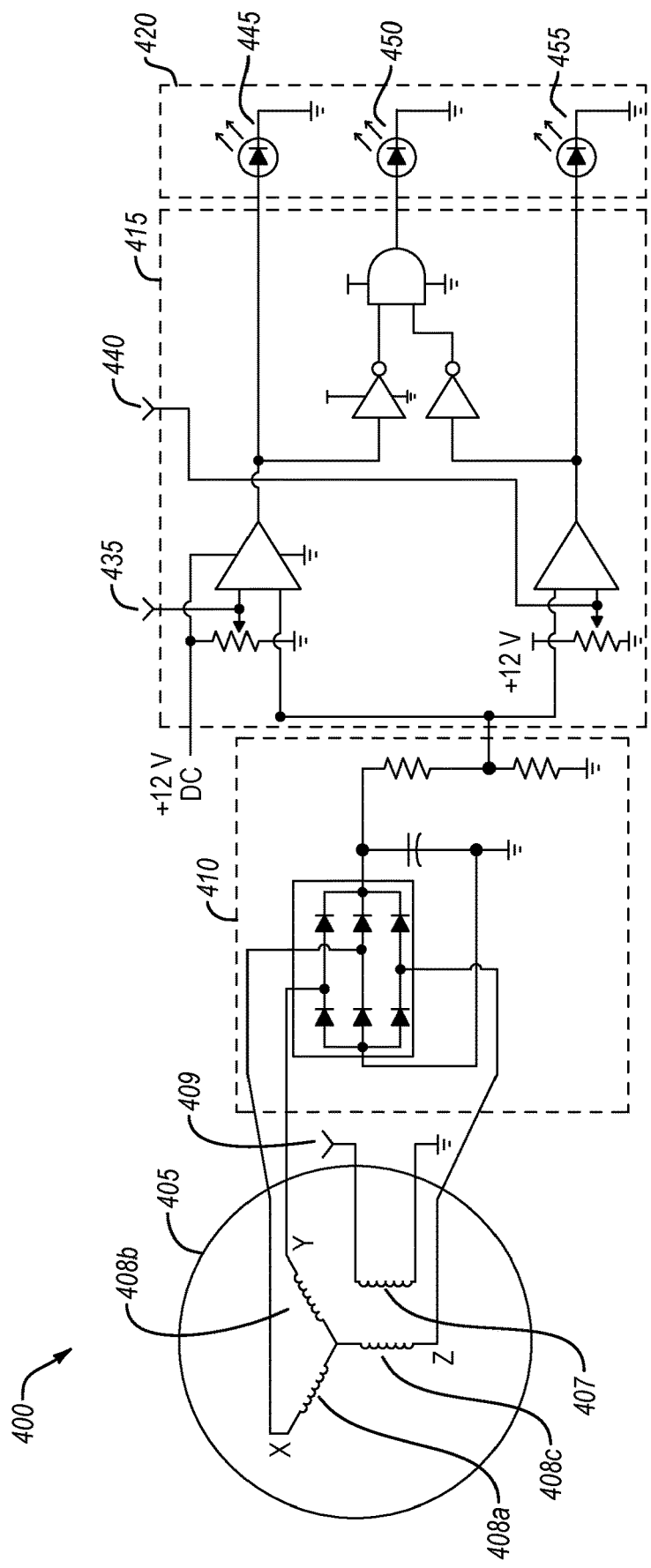
FIG. 4 is a schematic block diagram of a system for detecting degradation of an actuator-position sensor, according to one or more examples of the present disclosure.

Referring to FIG. 4, in various examples, a system 400 for the detection of degradation of an actuator-position sensor is shown. System 400 includes actuator-position sensor 405, voltage rectifier circuit 410, comparator circuit 415 and condition display device 420.

In one example, actuator-position sensor 405 is a type of rotary electrical transformer sensor that is used for measuring the angle of a rotating member. The measurement of the angle of rotation can be converted to a linear measurement. Primary winding 407 of the transformer, fixed to the rotor, is excited by an alternating current when excitation voltage 409 is applies to primary winding 407. In one or more examples, excitation voltage of 28 Vac is applied to the primary winding. In one or more examples, excitation voltage 409 is supplied by degradation detection system 212 via airplane interface cable assembly 210. Application of excitation voltage causes voltages to appear between the Y-connected secondary windings (408a, 408b, and 408c) fixed at 120 degrees to each other on the stator. The voltages are transmitted to voltage rectifier circuit 410.

Figure 5:
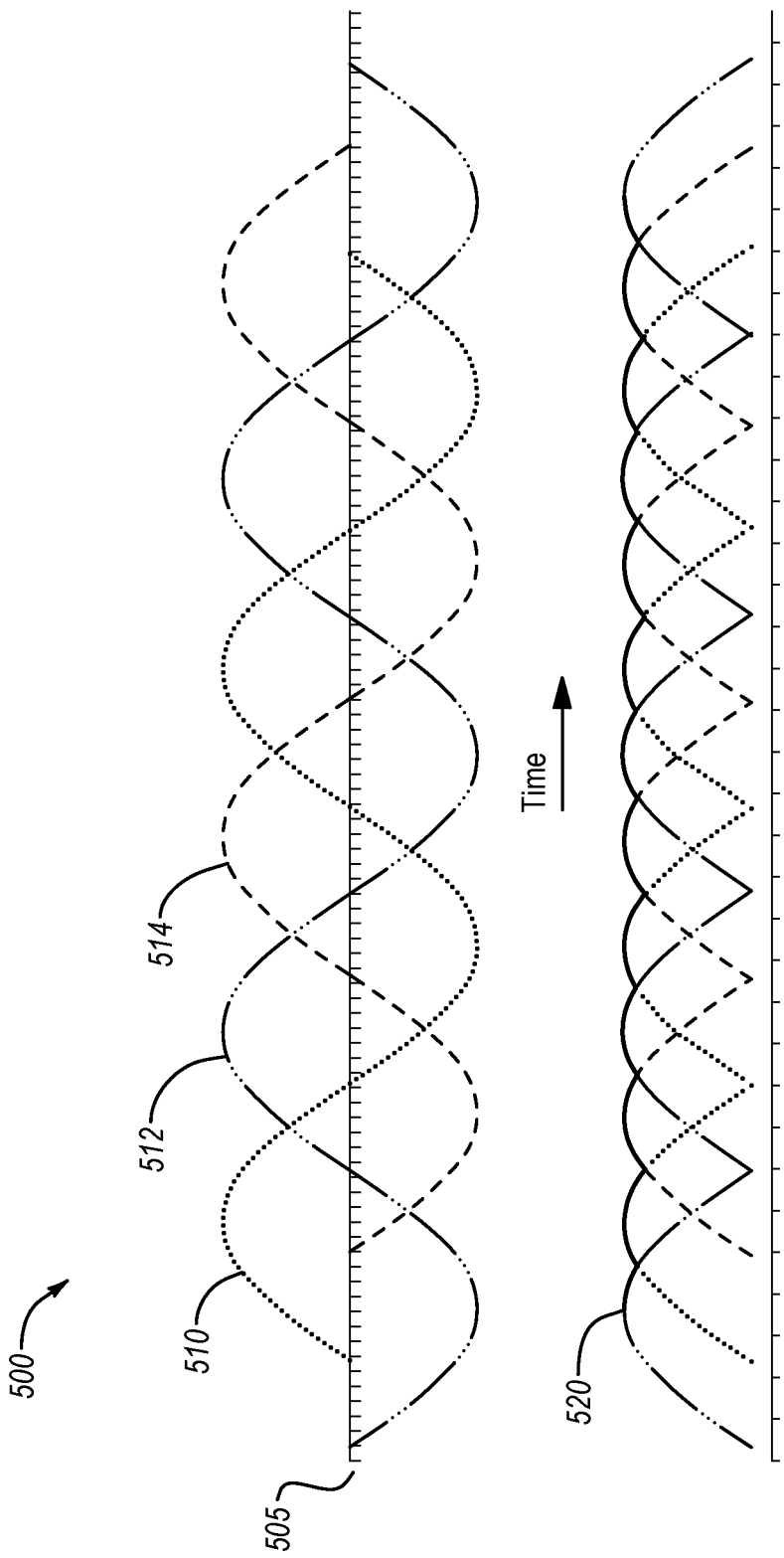
FIG. 5 is a graph showing input and output voltage of the voltage rectifier circuit of FIG. 4, according to one or more examples of the present disclosure.

The voltage that appears between the Y-connected secondary windings (408a, 408b, and 408c) fixed at 120 degrees to each other on the stator can be represented by the formula 0.454×Excitation Voltage sin (a), where a is 0, 120, and 240 respectively for the three voltages and corresponds to the angle of the secondary windings. Due to the 120 degree offset, the three voltages appear out of phase by 120 degrees to each other, as depicted in FIG. 5. FIG. 5 is a graph showing input and output voltage of the voltage rectifier circuit of FIG. 4, according to one or more examples of the present disclosure.

Waveform graph 500 shows input waveform 505 that includes three voltage signals, waveform 510, waveform 512, waveform 514 from actuator-position sensor 405. Waveform 520 represents the output signal of voltage rectifier circuit 410. In one or more examples, the output signal of voltage rectifier circuit 410 is a direct current voltage. The output signal of voltage rectifier circuit 410 is connected to comparator circuit 415. Comparator circuit 415 is designed to compare the output signal voltage of voltage rectifier circuit 410 with healthy signal voltage 435 and failure signal voltage 440.

If output signal voltage of voltage rectifier circuit 410 exceeds healthy signal voltage 435, LED 445 of output device 420 is activated. If output signal voltage of voltage rectifier circuit 410 exceeds failure signal voltage 440 but does not exceed health signal voltage 435, LED 450 of output device 420 is activated. If output signal voltage of voltage rectifier circuit 410 does not exceed failure signal voltage 440, LED 455 of output device 420 is activated. LED 445 corresponds to a healthy condition output. LED 450 corresponds to a degraded condition output. LED 455 corresponds to a failure condition output.

In one example, healthy signal voltage 435 is 75% of 5.93Vdc (the Voltage to comparator circuit 415) or 4.45 Vdc. In one example, failure signal voltage 440 is 26% of 5.93Vdc or 1.48 Vdc. In one example, voltage to comparator circuit 415 is 0.955× Vpeak/3 (where Vpeak=18.617V).

In one example, system 400 as shown in FIG. 4 is modified to test excitation voltage for one or more actuator-position sensors. In this example, voltage rectifier circuit 410 uses a full wave bridge rectifier instead of a three-phase rectifier. Additionally, since the excitation voltage check only requires a pass or fail output, comparator circuit 415 is slightly modified since the output of voltage rectifier circuit 410 is only compared to a single threshold.

Figure 6:
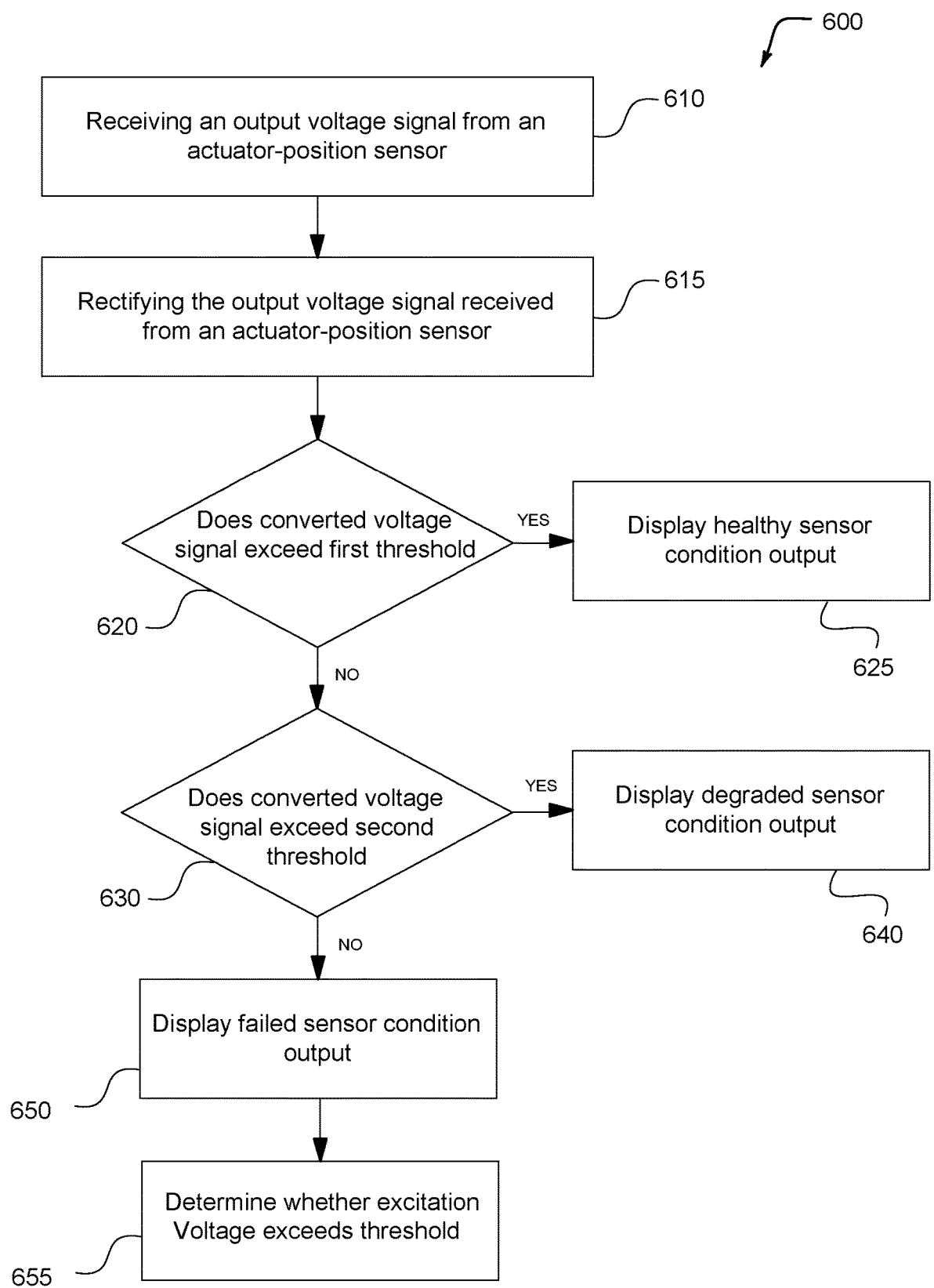
FIG. 6 is a flow diagram of a method for detecting degradation of an actuator-position sensor, according to one or more examples of the present disclosure.

FIG. 6 is a flow diagram of a method 600 for detecting degradation of an actuator-position sensor, according to one or more examples of the present disclosure. At 610, an output signal from an actuator-position sensor such as actuator-position sensor 405 is detected at voltage rectifier circuit 410. In one or more examples, a technician connects airplane interface cable assembly 210 to an appropriate connector of aircraft 102 to electrically couple the output of actuator-position sensor 405 with voltage rectifier circuit 410. In one or more examples, degradation detection system 212 is in-built in an aircraft and the output from actuator-position sensor 405 is electrically coupled to voltage rectifier circuit 410 without any technician action. In one or more examples, a technician uses degradation detection system 212 as part of ground check operations prior to airplane 102 being cleared for take-off. During this process, the technician operates wing flaps with degradation detection system 212 operational and receiving inputs from skew sensor 120, flap position transmitter 125, and flap position indicator 130.

At 615 of method 600, the output signal from actuator-position sensor 405 is rectified, such as by voltage rectifier circuit 410. At 620 of method 600, comparator circuit 415 determines whether the output of voltage rectifier circuit 410 exceeds a first threshold, in this example, healthy condition threshold 435. If comparator circuit 415 determines that the output of voltage rectifier circuit 410 exceeds healthy condition threshold 435, LED 445 of output device 420 is activated, at 625. If comparator circuit 415 determines that the output of voltage rectifier circuit 410 does not exceed healthy condition threshold 435, then at 630 of method 600, comparator circuit 415 determines whether the output of voltage rectifier circuit 410 exceeds a second threshold, in this example, failure condition threshold 440. If comparator circuit 415 determines that the output of voltage rectifier circuit 410 exceeds failure condition threshold 440, LED 450 of output device 420 is activated, at 640. If comparator circuit 415 determines that the output of voltage rectifier circuit 410 does not exceed failure condition threshold 440, LED 455 of output device 420 is activated, at 650.

Additionally, an excitation voltage check is performed at 655 of method 600. The technician selects the failed actuator-position sensor via excitation signal test selection switch 365. LED indicators 370 and 372 indicate whether there is sufficient excitation voltage 409 across primary winding 407 of the selected actuator-position sensor. In one or more examples, degradation detection system 212 transmits excitation voltage 409 to each actuator-position sensor. This voltage is measured by degradation detection system 212 to determine if there is sufficient excitation voltage 409 across primary winding 407. In one or more examples, excitation voltage 409 is checked whether or not the corresponding actuator-position sensor displays a failure condition.

In one or more examples, method 600 is performed simultaneously for each skew sensor 120, flap position transmitter 125, and flap position indicator 130 simultaneously and continuously. That is, device 300 displays an output that corresponds to each skew sensor 120, flap position transmitter 125, and flap position indicator 130 at all times when device 300 is powered on. In one example, when device 300 is powered on and airplane interface cable assembly 210 is not connected to aircraft 102, device 300 does not display any output. In another example, when device 300 is powered on and airplane interface cable assembly 210 is not connected to aircraft 102, device 300 displays a failure condition for each actuator-position sensor.

The hardware apparatus includes one or more pins, pads, or other electrical connections configured to send and receive data (e.g., in communication with one or more electrical lines of a printed circuit board or the like), and one or more hardware circuits and/or other electrical circuits configured to perform various functions of the degradation detection system 212.

The semiconductor integrated circuit device or other hardware appliance of the degradation detection system 212, in certain examples, includes and/or is communicatively coupled to one or more volatile memory media, which may include but is not limited to random access memory ("RAM"), dynamic RAM ("DRAM"), cache, or the like. In one example, the semiconductor integrated circuit device or other hardware appliance of the degradation detection system 212 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network, in one example, includes a digital communication network that transmits digital communications. The data network may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network may include one or more servers, routers, switches, and/or other networking equipment. The data network may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Although the degradation detection system 212 is designed for use in aerospace applications, such as the aircraft 102, in other applications, the degradation detection system 212 can be designed for use in other applications or vehicles. It is noted that the aircraft, in one example, may include civil and military aircraft, such as a private airplane, a commercial airplane, a cargo airplane, a jet, a helicopter, a drone, and/or the like. One of skill in the art, in light of this disclosure, will recognize the various types of aircraft that may be used with the solutions proposed herein.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for determining a condition of an actuator-position sensor, the system comprising:
   a first circuit electrically coupled with the actuator-position sensor to convert a voltage pattern generated by the actuator-position sensor to an output voltage;
   a comparator circuit electrically coupled with the first circuit and configured to determine if the output voltage of the first circuit exceeds a first threshold; and
   an output device electrically coupled to the comparator circuit and configured to indicate a first output, associated with a first condition of the actuator-position sensor, when the output voltage of the first circuit exceeds the first threshold.

2. The system of claim 1, wherein:
the comparator circuit is further configured to determine if the output voltage of the first circuit exceeds a second threshold that is different than the first threshold; and
the output device indicates a second output, associated with a second condition of the actuator-position sensor, when the output voltage of the first circuit exceeds the second threshold, but not the first threshold.

3. The system of claim 2, wherein:
the comparator circuit is further configured to determine if the output voltage of the first circuit does not exceed the second threshold; and
the output device indicates a third output, associated with a third condition of the actuator-position sensor, when the output voltage of the first circuit does not exceed the second threshold.

4. The system of claim 1, wherein:
the voltage pattern generated by the actuator-position sensor comprises a first AC voltage output, a second AC voltage output, and a third AC voltage output; and
the first circuit comprises a voltage rectifier circuit configured to convert the first AC voltage output, the second AC voltage output, and the third AC voltage output to a DC voltage output.

5. The system of claim 1, wherein, when an input voltage is applied to the actuator-position sensor and an actuator associated with the actuator-position sensor is actuated, the voltage pattern is generated at by the actuator-position sensor.

6. The system of claim 5 1, wherein the actuator comprises a wing-flap actuator.

7. The system of claim 5 4, further comprising an aircraft comprising a wing flap, the first circuit, the actuator, and the actuator-position sensor, wherein the actuator is a wing-flap actuator operable to extend and retract the wing flap.

8. The system of claim 1, wherein the actuator-position sensor comprises a three-phase synchro sensor.

9. A method of determining a condition of an actuator-position sensor, comprising:
sensing an output voltage signal from the actuator-position sensor;
converting the output voltage signal to a direct current voltage;
comparing the direct current voltage to a first voltage threshold;
when the direct current voltage exceeds the first voltage threshold, visually displaying an indicator of a healthy sensor condition;
when the direct current voltage does not exceed the first voltage threshold, but exceeds a second voltage threshold, visually displaying an indicator of a degraded sensor condition; and
in response to determining that the direct current voltage does not exceed the second voltage threshold, visually displaying an indicator of a failed sensor condition.

10. The method of claim 9, wherein:
the output voltage signal from the actuator-position sensor comprises a first AC voltage, a second AC voltage, and a third AC voltage; and
converting the output voltage signal to the direct current voltage comprises converting the first AC voltage, the second AC voltage, and the third AC voltage using a rectifier circuit.

11. The method of claim 9, further comprising actuating an actuator associated with the actuator-position sensor, wherein the output voltage signal is sensed when the actuator-position sensor is actuated.

12. The method of claim 11, further comprising applying a fourth AC voltage to a rotor circuit of the actuator-position sensor at least in part during a time period when the actuator associated with the actuator-position sensor is actuated.

13. The method of claim 11, wherein:
the actuator associated with the actuator-position sensor is a wing-flap actuator operable to extend and retract a wing flap of an aircraft; and
actuating the actuator associated with the actuator-position sensor further comprises extending the wing flap of the aircraft.

14. The method of claim 13, further comprising:
extending a first wing flap associated with a first wing;
determining a sensor condition associated with an actuator-position sensor associated with the first wing flap;
extending a second wing flap associated with a second wing; and
determining a sensor condition associated with an actuator-position sensor associated with the second wing flap.

15. A device for determining a condition of an actuator-position sensor, comprising:
a housing;
a first electrical connector configured to matingly engage with a second electrical connector associated with an output of the actuator-position sensor;
a sensor-condition indicator coupled to the housing;
a first circuit housed by the housing and electrically coupled to the first electrical connector, wherein the first circuit converts a voltage pattern generated by the actuator-position sensor to an output voltage; and
a second circuit housed by the housing and electrically coupled to the first circuit and the sensor-condition indicator, wherein the second circuit:
compares the output voltage to a threshold healthy voltage and a threshold failure voltage; and
transmits a signal to the sensor-condition indicator to display any one of a healthy visual output or a degraded visual output based on the comparison between the output voltage to the threshold healthy voltage and the threshold failure voltage.

16. The device of claim 15, wherein the first electrical connector, when matingly engaged with the second electrical connector, does not disrupt electrical connectibility between the second electrical connector and the actuator-position sensor.

17. The device of claim 15, wherein:
the sensor-condition indicator comprises a healthy condition indicator, a degraded condition indicator, and a failure condition indicator.

18. The device of claim 17, wherein the second circuit transmits the signal to the sensor-condition indicator to display any one of the healthy visual output, the degraded visual output, or a failure visual output based on the comparison between the output voltage to the threshold healthy voltage and the threshold failure voltage.

19. The device of claim 15, wherein the first circuit converts the voltage pattern generated by the actuator-position sensor to an output voltage by rectifying three AC voltages, generated by the actuator-position sensor, to a direct current output voltage.

20. The device of claim 15, further comprising an excitation check circuit configured to generate an excitation signal and transmit the excitation signal to the actuator-position sensor.

* * * * *